United States Patent
Morita

(10) Patent No.: US 12,198,738 B1
(45) Date of Patent: Jan. 14, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Masaki Morita, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/440,606

(22) Filed: Feb. 13, 2024

(30) Foreign Application Priority Data

Aug. 31, 2023 (JP) ................. 2023-141363

(51) Int. Cl.
  *G11B 5/48* (2006.01)
  *G11B 5/54* (2006.01)
(52) U.S. Cl.
  CPC .............. *G11B 5/54* (2013.01); *G11B 5/4833* (2013.01)
(58) Field of Classification Search
  CPC ....... G11B 5/4826; G11B 5/4846; G11B 5/54; G11B 21/22; G11B 5/56; G11B 21/12; G11B 5/1272; G11B 5/4833; G11B 21/21; G11B 33/1466; G11B 33/12; G11B 33/123; G11B 33/127

USPC .............................................. 360/254.4, 99.2
See application file for complete search history.

(56) References Cited

U.S. PATENT DOCUMENTS

| | | | |
|---|---|---|---|
| 6,344,950 B1 | 2/2002 | Watson et al. | |
| 7,672,083 B1 * | 3/2010 | Yu .......................... | G11B 21/22 360/254.9 |
| 7,697,238 B2 | 4/2010 | Makoto et al. | |
| 2009/0290258 A1 | 11/2009 | Matsuda et al. | |

* cited by examiner

*Primary Examiner* — Nabil Z Hindi
(74) *Attorney, Agent, or Firm* — Maier & Maier, PLLC

(57) ABSTRACT

According to one embodiment, a magnetic disk device includes a base having a pedestal, a magnetic disk, an actuator that supports and drives a head, and a ramp that is provided on the pedestal and holds the head in an unloading position. The pedestal has a first face, a first hole provided in the first face, a support sleeve disposed on the first face and coaxial with the screw hole, and a recess provided in the support sleeve. The ramp has a guide face that supports the head, a second face opposing the first face, a second hole opened in the second face and configured to receive the support sleeve, and a protrusion that engages with the recess and regulates a pivoting of the ramp around the support sleeve, and is fixed to the pedestal using a fastener that is passed through the second hold and into the first hole.

17 Claims, 10 Drawing Sheets

MAGNETIC DISK DEVICE

CROSS-REFERENCE TO RELATED APPLICATION(S)

This application is based upon and claims the benefit of priority from Japanese Patent Application No. 2023-141363, filed Aug. 31, 2023, the entire contents of which are incorporated herein by reference.

FIELD

Embodiments described herein relate generally to a magnetic disk device.

BACKGROUND

As a magnetic disk device, for example, a hard disk drive (HDD) has a magnetic disk provided to be able to rotate freely, and a magnetic head that carries out a recording onto and a read of data from the magnetic disk. The head is supported by a suspension of an actuator. The head is moved by the actuator between a loading position on the magnetic disk and an unloading position on an outer side of the magnetic disk. Also, the HDD includes a ramp that holds the head that has moved to the unloading position.

Normally, the ramp is fixed by screwing to a housing of the HDD in a state positioned in a predetermined position in the housing. A method whereby the ramp is abutted against and screwed to a wall of the housing, with a pin as a center of rotation, is often applied as a ramp positioning method.

Examples of related art include US2009/0290258, U.S. Pat. Nos. 7,697,238B, and 6,344,950B.

SUMMARY

According to an embodiment of the present disclosure, there is provided a magnetic disk device comprising a housing. The housing of the magnetic disk device comprises a base and a side wall surrounding the base. The housing of the magnetic disk device further comprises a pedestal disposed adjacent to an interior portion of the side wall. Additionally, the magnetic disk device comprises a magnetic disk provided on the base. Further, the magnetic disk device comprises an actuator comprising a head. The magnetic disk device additionally comprises a ramp configured to couple to the pedestal. The pedestal of the magnetic disk device comprises a first face having a first hole configured to receive a fastener. Additionally, the pedestal of the magnetic disk device comprises a support sleeve, having a recess, disposed on the first face and coaxial with the first hole. The magnetic disk device further comprises a ramp, which comprises a second face that opposes the first face of the pedestal. The ramp of the magnetic disk device further comprises a second hole in the second face and configured to receive the support sleeve. Additionally, the ramp of the magnetic disk device further comprises at least a first protrusion configured to fit within the recess of the pedestal.

In some implementations, the support sleeve of the magnetic disk device further comprises an annular contact face. In certain implementations, the recess of the support sleeve is disposed within the annular contact face and has a first side face that extends parallel to an axis of the first hole. In further implementations, the ramp of the magnetic disk device further comprises a second sleeve disposed coaxially with the engagement hole and configured to contact the contact face. In some implementations, the second sleeve of the ramp comprises the first protrusion.

In certain implementations, the support sleeve of the magnetic disk device is integrally formed with the pedestal. In some implementations, the recess of the support sleeve comprises a bottom face positioned approximately parallel to the first face. In certain implementations, the recess of the support sleeve further comprises a second side face, the second side face extending parallel to the axis of the first hole and disposed across a gap in a circumferential direction of the support sleeve from the first side face.

In further implementations, the second sleeve of the ramp of the magnetic disk device is integrally formed with the ramp and comprises a resin. In some implementations, the second sleeve of the ramp of the magnetic disk device comprises a metal, and is disposed within the second hole of the ramp. In certain implementations, the recess of the support sleeve defines an opening of the support sleeve in a radial direction of the support sleeve. In further implementations, the recess of the support sleeve comprises a groove in the bottom face, the groove extending in the circumferential direction of the support sleeve. In certain implementations, the protrusion comprises a projection configured to fit within the groove.

In some implementations, the recess further comprises an inner peripheral face positioned between the first side face and the second side face. In certain implementations, the protrusion is configured to contact the inner peripheral face and one of the first side face and the second side face. In further implementations, the recess further comprises an outer peripheral face positioned between the two side faces. In certain implementations, the protrusion is configured to contact the outer peripheral face and one of the first side face and the second side face.

In further implementations, the protrusion is configured to contact the first side face or the second side face of the recess to regulate pivoting of the ramp around the support sleeve.

In some implementations, the actuator of the magnetic disk device is configured to support and drive a head. In certain implementations, the ramp of the magnetic disk device is configured to hold the head in an unloading position. In further implementations, the ramp of the magnetic disk device comprises a guide face that supports the head.

In some implementations, the ramp is configured to couple to the pedestal with a fastener passed through the first hole and the second hole. In certain implementations, the fastener is a screw and the first hole is a screw hole. In further implementations, the support sleeve is tubular and disposed upright on the first face.

DETAILED DESCRIPTION

Figure 1:
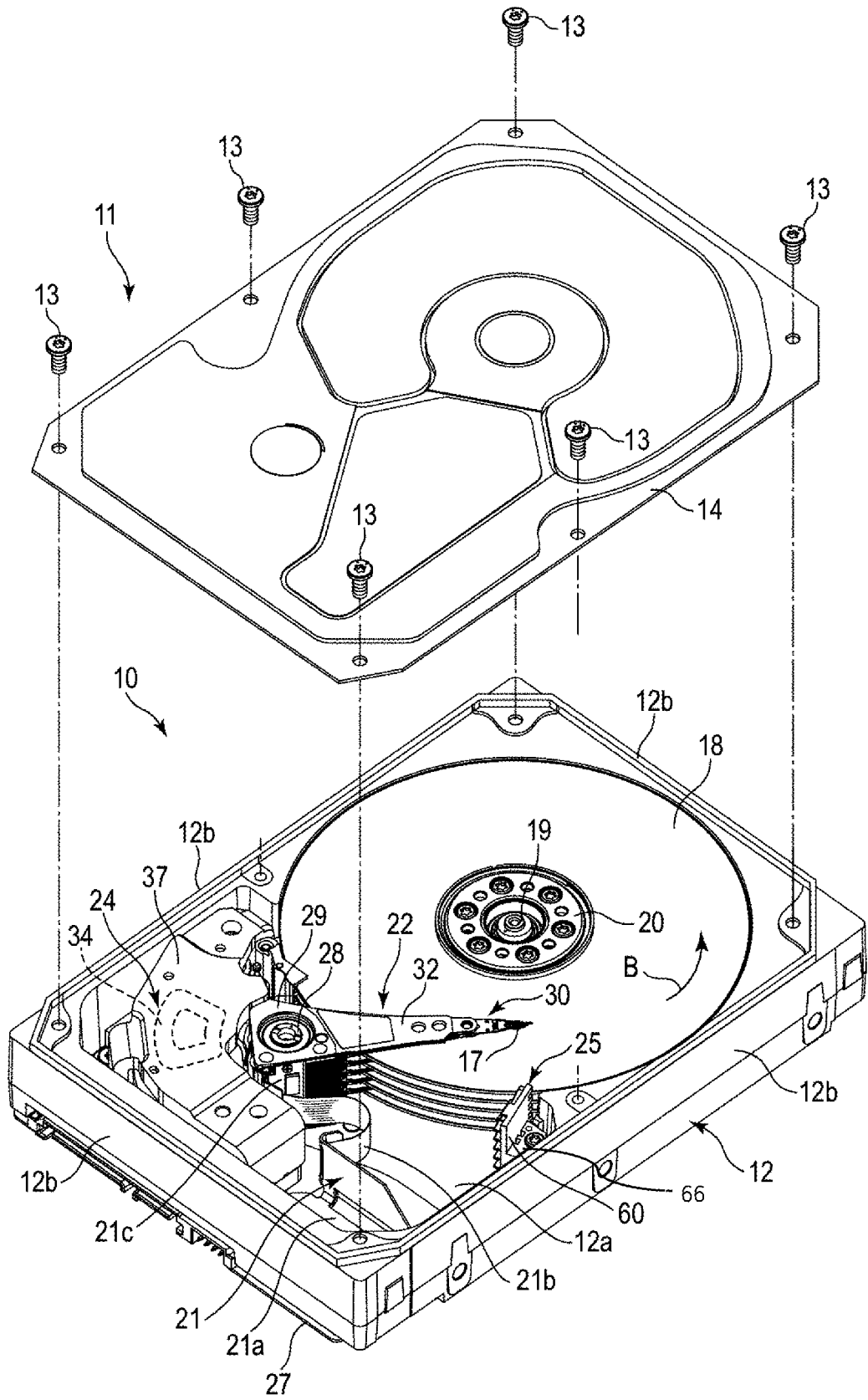
FIG. 1 is an exploded perspective view of a hard disk drive (HDD) according to a first embodiment.

As heretofore described, a hole through which a pin is inserted, a screw hole, and a contact wall may be provided in a ramp installation portion of a housing, and a large number of processes may be implemented on the housing.

Embodiments provide a disk device such that a ramp can be easily positioned and fixed in a housing, and a processing region of the housing can be reduced.

In general, according to one embodiment, a magnetic disk device has a base having a ramp installation portion, a magnetic disk provided on the base to be able to rotate freely, an actuator that supports and drives a head to be able to move with respect to the magnetic disk, and a ramp that is provided in the ramp installation portion and holds the head in an unloading position. The ramp installation portion has an installation face, a screw hole provided in the installation face, a tubular support sleeve that is disposed upright on the installation face and communicates with the screw hole, and a first engagement portion provided in the support sleeve. The ramp has a guide face that supports the head, an opposing face that opposes the installation face, an engagement hole that is opened in the opposing face and through which the support sleeve is inserted, and a second engagement portion that engages with the first engagement portion and regulates a pivoting of the ramp around the support sleeve, and is fixed to the ramp installation portion using a fixing screw that is passed through the engagement hole and screwed into the screw hole.

Hereafter, a magnetic disk device according to embodiments will be described, while referring to the drawings.

The disclosure is only one example, and appropriate changes by those skilled in the art that maintain the gist of the disclosure and may be easily conceived of are, of course, included in the scope of the disclosure. Also, although there are cases wherein a width, a thickness, a form, and the like of each portion is represented schematically in the drawings in comparison with an actual aspect in order to further clarify the description, this is only one example, and does not limit an interpretation of the disclosure. Also, in the specification and the drawings, the same reference sign is allotted to a component the same as a component previously described in relation to a previous drawing, and a detailed description may be omitted or simplified as appropriate.

A hard disk drive (HDD) relating to a first embodiment will be described in detail as a magnetic disk device. FIG. 1 is an exploded perspective view of the HDD according to the first embodiment shown with a top cover removed.

As shown in FIG. 1, an HDD 11 includes a housing 10 of a rectangular form. The housing 10 has a base 12, of a rectangular box form whose upper face is opened, and a cover (top cover) 14. The base 12 has a bottom wall 12a of a rectangular form, and a side wall 12b disposed upright along a peripheral edge of the bottom wall 12a, and is formed in an integrated manner of, for example, aluminum. The cover 14 is formed in a rectangular plate form of, for example, stainless steel. The cover 14 is screwed onto the side wall 12b of the base 12 using a multiple of screws 13, and hermetically closes off an upper aperture of the base 12.

A multiple, five for example, of magnetic disks 18 acting as disk-form recording media, and a spindle motor 19 that supports the magnetic disk 18 and causes the magnetic disk 18 to rotate, is provided in the housing 10. The spindle motor 19 is disposed on the bottom wall 12a. Each magnetic disk 18 has a substrate formed in a circular form of, for example, a 95 mm (3.5 inch) diameter, and a magnetic recording layer formed on an upper face and a lower face of the substrate. The magnetic disks 18 are fitted coaxially with each other onto a hub of the spindle motor 19, and furthermore, are clamped using a clamping spring 20. Because of this, the magnetic disk 18 is supported in a state positioned parallel to the bottom wall 12a of the base 12. The multiple of magnetic disks 18 are rotated in an arrow B direction at a predetermined rotational speed by the spindle motor 19. The number of magnetic disks 18 mounted, not being limited to five, may be four or less, or six or more.

A multiple of magnetic heads 17, which carry out a write and a read of information from and onto the magnetic disk 18, and an actuator assembly 22 that supports the magnetic heads 17 to be able to move freely with respect to the magnetic disk 18, are provided in the housing 10. Also, a voice coil motor (VCM) 24 that pivots and positions the actuator assembly 22, a ramp loading mechanism 25 that holds the magnetic head 17 in an unloading position in which the magnetic head 17 is detached from the magnetic disk 18 when the magnetic head 17 moves to an outermost periphery of the magnetic disk 18, and a substrate unit (FPC unit) 21 on which electronic parts such as a conversion connector are mounted, are provided in the housing 10.

The actuator assembly 22 has an actuator block 29, which is supported to be able to pivot freely around a support shaft 28, a multiple of arms 32 extending from the actuator block 29, and a suspension assembly 30 extending from each arm 32. The support shaft 28 is disposed upright on the bottom wall 12a. The magnetic head 17 is supported by a leading end portion of each suspension assembly 30.

The actuator assembly 22 has an unshown support frame that extends from the actuator block 29 in a direction opposite to that of the arm 32. A voice coil 34 is supported by the support frame. The voice coil 34 is positioned between a pair of yokes 37 fixed onto the base 12, and configures the VCM 24 together with the yokes 37 and a magnet fixed to one of the yokes.

The FPC unit 21 has a base portion 21a fixed to the bottom wall 12a, a relay portion 21b of a long and thin strip form extending from the base portion 21a, and a joint portion 21c provided continuous with a leading end of the relay portion 21b. The base portion 21a, the relay portion 21b, and the joint portion 21c are formed of a flexible printed circuit (FPC). The joint portion 21c is attached to the actuator block 29.

A printed circuit board 27 is screwed to an outer face of the bottom wall 12a of the base 12. The base portion 21a of the FPC unit 21 is connected to the printed circuit board 27 via an unshown connector. The printed circuit board 27 configures a control unit (controller) that controls an operation of the spindle motor 19, and controls an operation of the VCM 24 and the magnetic head 17 via the substrate unit 21.

Figure 2:
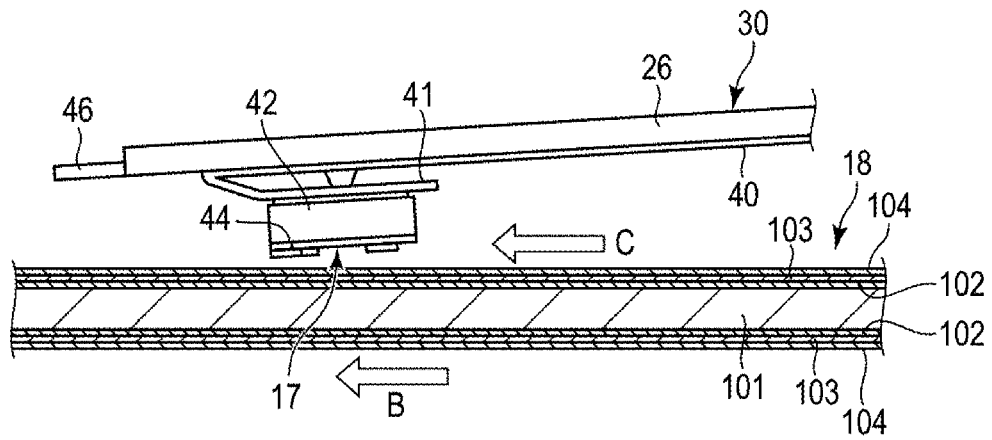
FIG. 2 is a side view schematically showing a magnetic head, a suspension, and a magnetic disk in the HDD.

FIG. 2 is a side view showing a magnetic head in a floating state and a magnetic disk.

As shown in the drawing, the magnetic disk 18 has a substrate 101 of a disk form made of a non-magnetic body, for example, glass. An underlayer 102, a magnetic recording layer 103, and a protective film 104 are stacked sequentially on each surface of the substrate 101. The magnetic disk 18 is rotated at a predetermined speed in the arrow B direction by the spindle motor 19.

The suspension assembly 30 has a suspension 26, a wiring member (flexure) 40 attached onto the suspension 26, and a tab 46 protruding from a leading end of the suspension 26. The magnetic head 17 is supported by a gimbal portion 41 of the wiring member 40. The magnetic head 17 is electrically connected to the FPC unit 21 via the wiring member 40.

The magnetic head 17 is configured as a floating type of head, and has a slider 42 formed in a substantially cuboid form, and a head portion 44 formed in an end portion on an outflow end (trailing) side of the slider 42. The head portion 44 includes a write head and a read head. The magnetic head 17 is maintained in a state floating a predetermined amount from a surface of the magnetic disk 18 by an airflow C generated between the disk surface and the slider 42 by a rotation of the magnetic disk 18. A direction of the airflow C corresponds to the direction of rotation B of the magnetic disk 18. In accompaniment to the rotation of the magnetic disk 18, the magnetic head 17 travels in a direction (circumferential direction) opposite to the direction of rotation B with respect to the magnetic disk 18.

Next, a ramp of the ramp loading mechanism 25 will be described.

Figure 3:
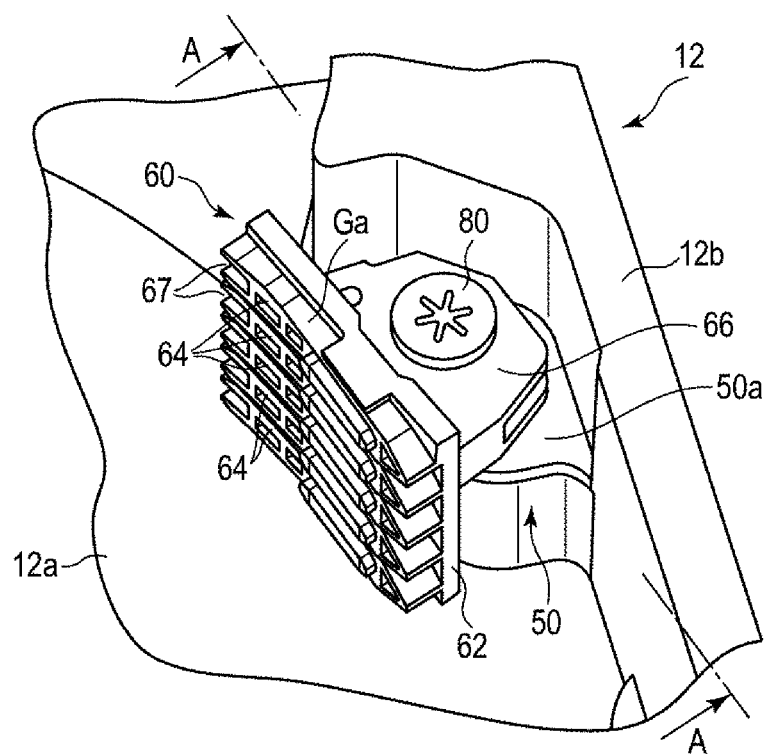
FIG. 3 is a perspective view showing a ramp installation portion of a housing of the HDD and a ramp.
Figure 4:
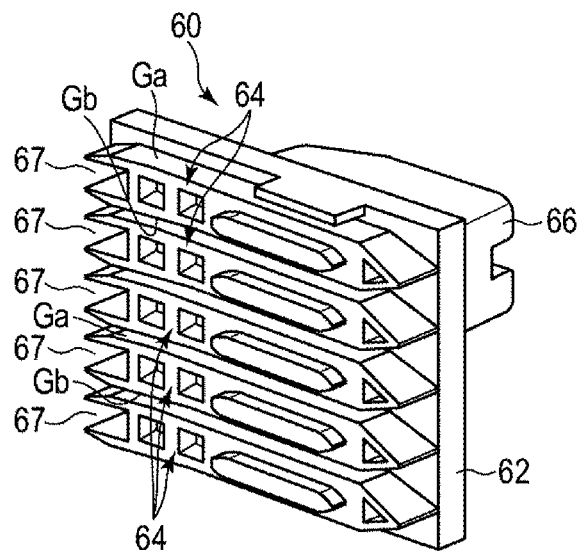
FIG. 4 is a perspective view showing the ramp.
Figure 5:
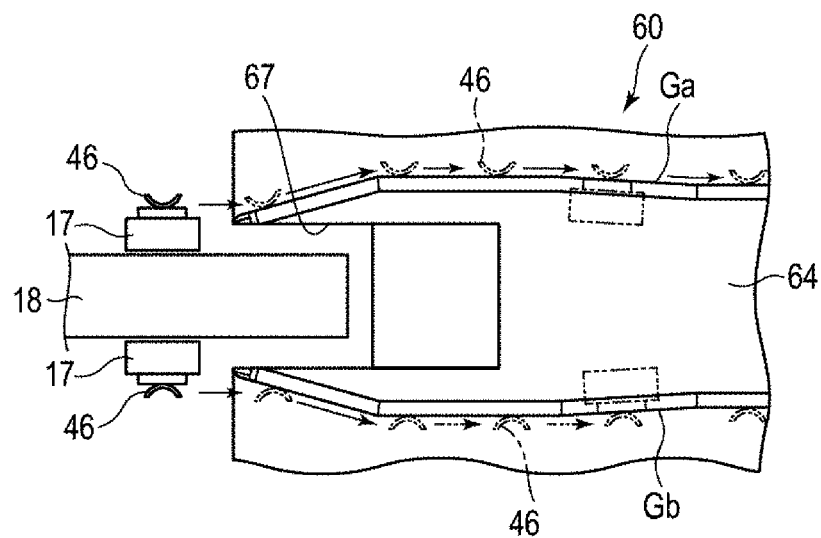
FIG. 5 is a side view showing one portion of the ramp enlarged.

FIG. 3 is a perspective view showing a ramp installation portion of a housing and a ramp, FIG. 4 is a perspective view showing a ramp, and FIG. 5 is a side view showing one portion of a ramp enlarged.

As shown in FIG. 3, the base 12 of the housing 10 has, integrated therein, a ramp installation portion 50 for installing a ramp 60. The ramp installation portion 50 is disposed protruding as a pedestal portion in a corner portion of the bottom wall 12a and the side wall 12b of the base 12. The ramp installation portion 50 has a flat installation face 50a. The installation face 50a is positioned in an approximate midpoint in a height direction of the side wall 12b, and extends approximately parallel to the bottom wall 12a.

As shown in FIGS. 3 and 4, the ramp 60 has a ramp main body 62 formed in a rectangular plate form, five guide blocks 64 disposed protruding on one face of the ramp main body 62, and a support bracket 66 disposed protruding on an other face of the ramp main body 62, and, for example, is molded in an integrated manner from a synthetic resin or a metal. As shown in FIGS. 1 and 3, the support bracket 66 is mounted on the installation face 50a, and furthermore, is fixed to the installation face 50a using a fixing screw 80.

By fixing the support bracket 66 to the ramp installation portion 50, the ramp main body 62 is disposed in a state standing approximately vertically with respect to the bottom wall 12a of the base 12. The guide block 64 is positioned in a vicinity of a peripheral edge portion of the corresponding magnetic disk 18.

As shown in FIGS. 3 and 4, the guide block 64 has a long and thin cuboid form, and extends approximately parallel to the bottom wall 12a. The five guide blocks 64 are arrayed at predetermined intervals in an axial direction of the magnetic disk 18. A rectangular recessed portion (cutout) 67 is formed at one end on the magnetic disk 18 side of each guide block 64. In a state wherein the ramp 60 is installed in the ramp installation portion 50, outer peripheral edge portions of the five magnetic disks 18 are positioned, maintaining a gap, in the recessed portion 67 of the corresponding guide block 64.

Each guide block 64 has an upper guide face (first guide face) Ga, which guides and supports the tab 46 of the down-head suspension assembly 30, and a lower guide face (second guide face) Gb, which guides and supports the tab 46 of the up-head suspension assembly 30. The upper guide face Ga and the lower guide face Gb oppose each other, and are provided approximately vertically with respect to the one face of the ramp main body 62.

The upper guide faces Ga and the lower guide faces Gb of the five guide blocks 64 are disposed in accordance with a height of the corresponding suspension assembly 30. Each of the guide faces Ga and Gb extends as far as a vicinity of the outer peripheral edge of the magnetic disk 18, approximately following a radial direction of the magnetic disk 18, and is disposed in a movement path of the tab 46.

FIG. 5 is a side view showing one portion of a magnetic disk, a head, and a ramp enlarged. On the magnetic head 17 moving away from an outer periphery of the magnetic disk 18 toward the unloading position when the HDD is not operating, the tab 46 of the suspension assembly 30 rides up onto the upper guide face Ga or the lower guide face Gb of the ramp 60, as shown in the drawing. Furthermore, the tab 46 moves to the unloading position along the upper guide face Ga or the lower guide face Gb of the ramp 60, and stops. Because of this, the magnetic head 17 is held in the unloading position, which is detached from the magnetic disk 18, by the ramp 60.

Next, an attachment positioning structure of the ramp 60 will be described.

Figure 6:
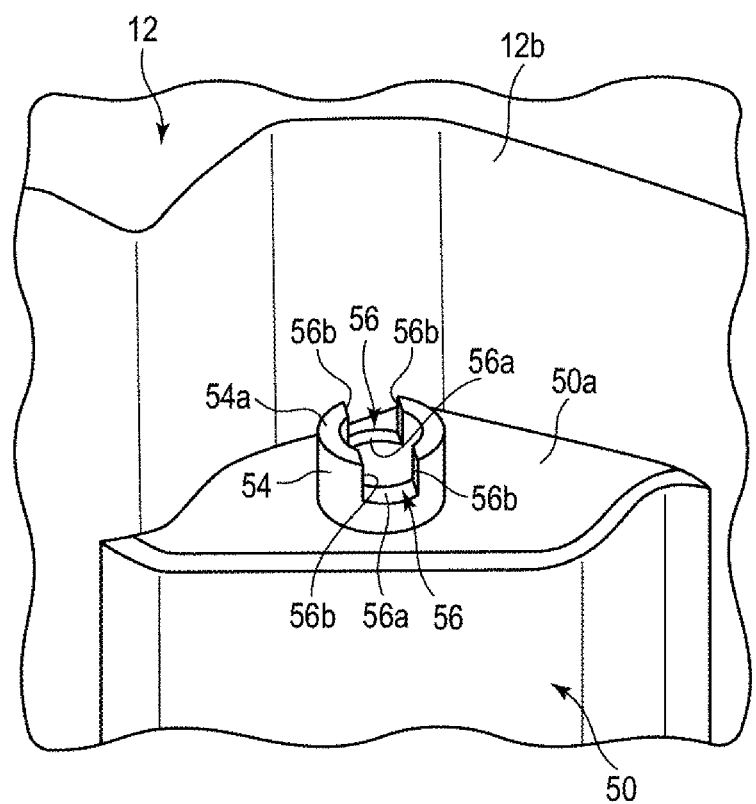
FIG. 6 is a perspective view showing the ramp installation portion.
Figure 7:
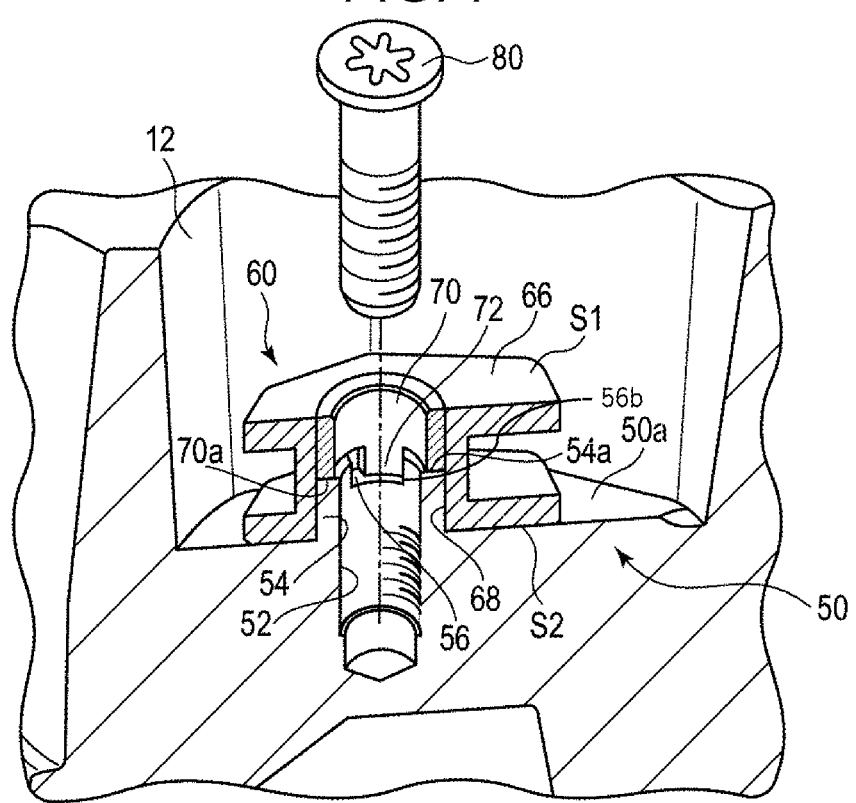
FIG. 7 is a sectional view of a ramp installation portion and a ramp along a line A-A of FIG. 3.

FIG. 6 is a perspective view showing a ramp installation portion, and FIG. 7 is a sectional view of a ramp installation portion and a ramp along a line A-A of FIG. 3.

As shown in the drawings, a screw hole 52 that extends penetrating the installation face 50a is formed in the ramp installation portion 50. That is, the screw hole 52 extends approximately vertically from the installation face 50a toward the bottom wall 12a, and is opened in the installation face 50a. Furthermore, the ramp installation portion 50 has a cylindrical support sleeve 54 provided protruding on the installation face 50a. The support sleeve 54 is disposed coaxially with the screw hole 52. An inner hole of the support sleeve 54 has a diameter equivalent to a diameter of the screw hole 52, and communicates coaxially with the screw hole 52. According to the present embodiment, the support sleeve 54 is formed integrated with the ramp installation portion 50 and of the same metal as that of the base 12.

A leading end face of the support sleeve 54 configures a contact face 54a of an annular form. The support sleeve 54 further comprises at least a first engagement portion 56, which in the exemplary embodiment of FIG. 6 is shown as a pair of positioning recesses (or cutouts) 56 formed in the contact face 54a. Each positioning recess 56 is formed in, for example, an approximately rectangular form, and has a pair of side faces 56b, which extend in an axial direction of the support sleeve 54 and oppose each other across a gap in a circumferential direction of the support sleeve 54. Each positioning recess 56 defines an arc form, which is positioned between the pair of side faces 56b and is approximately parallel to the installation face 50a. In one example, the pair of positioning recesses 56 are provided separated by 180 degrees in the circumferential direction.

As shown in FIG. 7, the support bracket 66 of the ramp 60 has an upper face S1 and a lower face S2, which are opposed approximately parallel to each other, and a through hole 68 formed penetrating the support bracket 66. The through hole 68 extends perpendicular to the upper face S1 and the lower face S2, and is opened in the upper face S1 and the lower face S2. A diameter of the through hole 68 approximately coincides with an outer diameter of the support sleeve 54 of ramp installation portion 50. The support bracket 66 has a second sleeve 70 of a cylindrical form fitted in the through hole 68. In the present embodiment, the ramp 60 is formed of a synthetic resin, and the second sleeve 70 is formed of a metal.

The second sleeve 70 has an outer diameter approximately equivalent to the diameter of the through hole 68, and an inner diameter approximately equivalent to, or slightly larger than, the diameter of the screw hole 52. A length in an axial direction of the second sleeve 70 is formed to be in the region of one-half of a length in an axial direction of the through hole 68. The second sleeve 70 is fitted into an upper half portion of the through hole 68. An upper end face of the second sleeve 70 is positioned in approximately the same plane as the upper face S1 of the bracket 66. A lower end face of the second sleeve 70 configures a second contact face 70a that can be brought into contact with the contact face 54a of the support sleeve 54. Furthermore, the second sleeve 70 has a pair of positioning protruding portions 72 that protrude downward from the lower end face. The pair of positioning protruding portions (only one is shown in the drawings) 72 are provided at an interval of approximately 180 degrees in a circumferential direction of the second sleeve 70. The protruding portion 72 has a size and a form such that the protruding portion 72 can be engaged with the pair of recesses 56 of the support sleeve 54. More specifically, each protruding portion 72 has a circumferential direction width smaller than a circumferential direction width of the recess 56, and a protrusion height less than a depth in an axial direction of the recess 56. Further, the protruding portion 72 can come into contact with either side face 56b of the recess 56.

As shown in FIG. 7, the support sleeve 54 is inserted into and inserted through the through hole 68 of the support bracket 66 in a state wherein the support bracket 66 is installed in the ramp installation portion 50. The lower end face of the second sleeve 70 comes into contact with the contact face 54a of the support sleeve 54, at the same time as which the lower face (opposing face) S2 of the support bracket 66 opposes the installation face 50a. In the present embodiment, the lower face S2 of the support bracket 66 is in contact with the installation face 50a. The pair of protruding portions 72 are positioned in the corresponding recess 56. By the support bracket 66 being engaged with a peripheral face of the support sleeve 54, positioning in a planar direction (a direction parallel to the installation face 50a) is carried out. Also, positioning in an axial direction of the support bracket 66 is carried out by the lower face S2 and the lower end face of the second sleeve 70 coming into contact with the installation face 50a and the contact face 54a of the support sleeve 54 respectively.

The pair of protruding portions 72 of the second sleeve 70 are loosely engaged with the pair of recesses 56 of the support sleeve 54. Positioning (rotation stopping) in a circumferential direction (a direction of rotation) of the support bracket 66 is carried out by each protruding portion 72 being pivoted to a position in which the protruding portion 72 comes into contact with one side face 56b of the recess 56, and coming into contact. That is, one side face 56b forms a regulating face that regulates a pivoting of the ramp 60. As it is sufficient that the regulating face 56b can regulate the pivoting of the ramp 60, it is sufficient that the regulating face 56b extends in a direction intersecting the bottom face 56a. Not being limited to a configuration vertical with respect to the bottom face 56a, the regulating face 56b may extend in a direction inclined with respect to the bottom face 56a by an angle of 90 degrees or less or 90 degrees or more.

In a state wherein the support bracket 66 is positioned as heretofore described, the support bracket 66 is fixed to the ramp installation portion 50 by the fixing screw 80 being passed through the second sleeve 70 of the support bracket 66 and screwed into the screw hole 52. By so doing, the ramp 60 is fixed and disposed in a predetermined position with respect to the multiple of magnetic disks 18 and the multiple of magnetic heads 17.

When screwing in the fixing screw 80, the support bracket 66 pivots together with the fixing screw 80, and the pair of protruding portions 72 are pressed against the side face 56b of the recess 56. Because of this, positioning of the support bracket 66 in the circumferential direction is automatically carried out.

According to an HDD according to the first embodiment configured as heretofore described, an installation portion of the ramp 60 is such that the support sleeve 54 of the ramp installation portion 50 or a second sleeve of the ramp 60 is provided with both a function of positioning the ramp 60 and a function of stopping a rotation of the ramp 60. Because of this, there is no need to provide a positioning contact face or an independent through hole in the base 12 of a housing, and a base processing region can be reduced. Because of this, freedom of base design can be increased, and a reduction in cost and an improvement in quality owing to the reduction of the processing region can be carried out.

Therefore, according to the first embodiment, a disk device such that a ramp can easily be positioned with respect to a housing and fixed, and a housing processing region can be reduced, can be provided.

Next, ramp installation structures of HDDs according to modifications and other embodiments will be described. In the modifications and other embodiments described hereafter, identical reference signs will be allotted to portions identical to those in the first embodiment, a detailed description thereof will be omitted or simplified, and a detailed description will be given centered on portions differing from the first embodiment.

Figure 8:
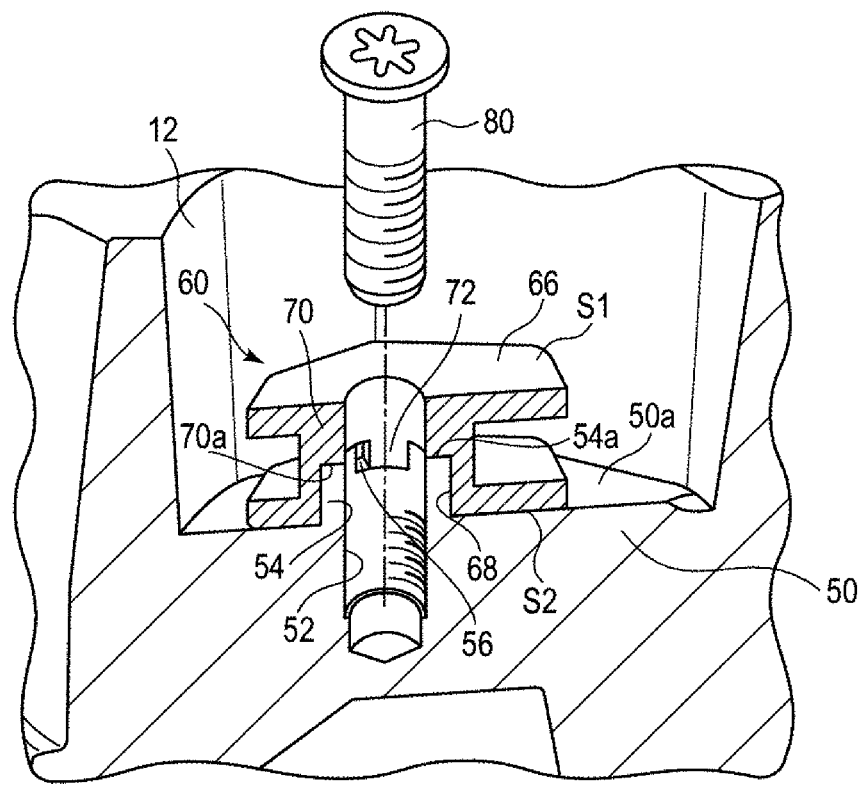
FIG. 8 is a sectional view of a ramp installation portion and a ramp of an HDD according to a first modification.

FIG. 8 is a sectional view of a ramp installation portion and a ramp of an HDD according to a first modification.

As shown in the drawing, the second sleeve 70 provided in the support bracket 66 of the ramp 60, not being limited to a metal sleeve, may be formed, integrated with the support bracket 66, of, for example, a synthetic resin. In this case, an independent second sleeve is unneeded, and ease of manufacture and ease of assembly of the ramp 60 improve.

Figure 9:
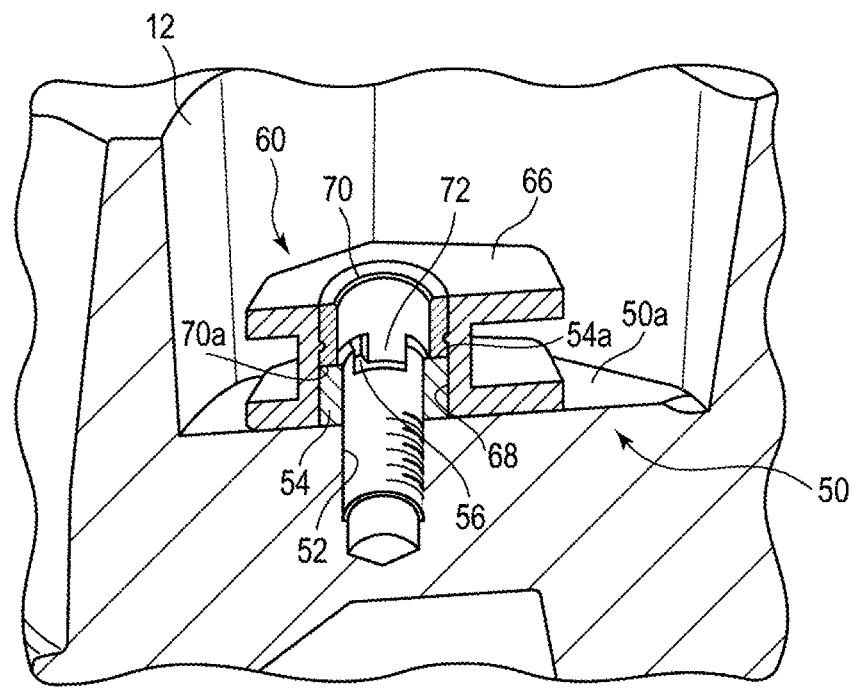
FIG. 9 is a sectional view of a ramp installation portion and a ramp of an HDD according to a second modification.

FIG. 9 is a sectional view of a ramp installation portion and a ramp of an HDD according to a second modification.

As shown in the drawing, the support sleeve 54 provided in the ramp installation portion 50 of the base 12 may be configured with a sleeve separate from the base 12. That is, a configuration such that the support sleeve 54 formed separately is fixed to the installation face 50a of the ramp installation portion 50 may be adopted. The support sleeve 54 can be fixed to the installation face 50a by welding, bonding, or the like. When the support sleeve 54 is a separate part, a processing region of the base 12 can be further reduced.

Figure 10:
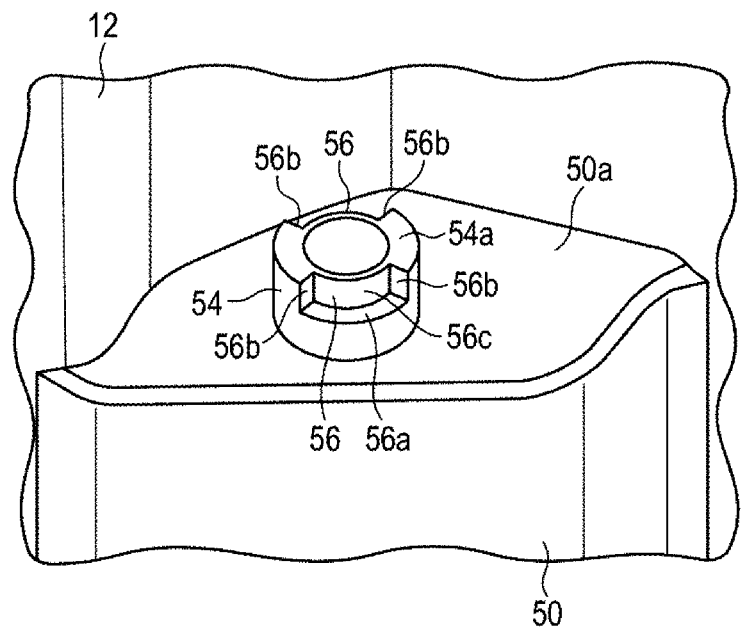
FIG. 10 is a perspective view showing a ramp installation portion of an HDD according to a second embodiment.
Figure 11:
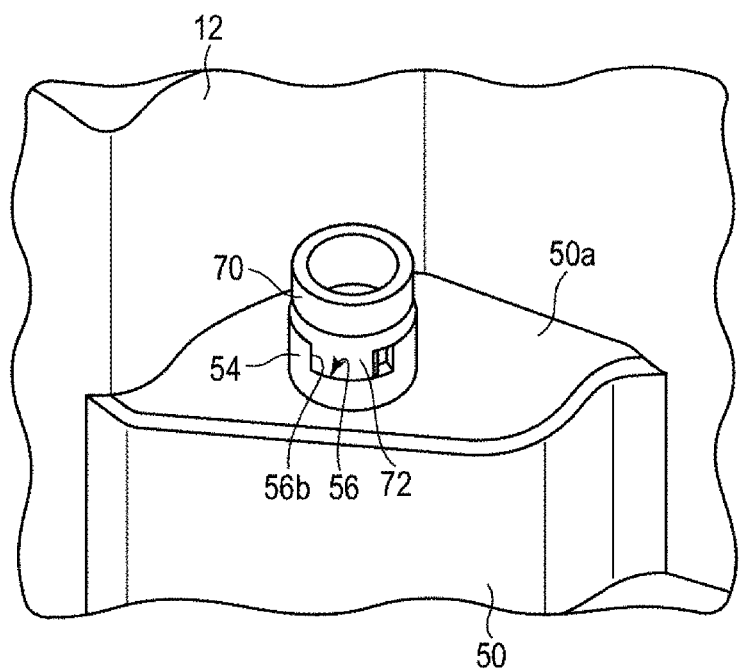
FIG. 11 is a perspective view showing a ramp installation portion and a ramp sleeve of the HDD according to the second embodiment.
Figure 12:
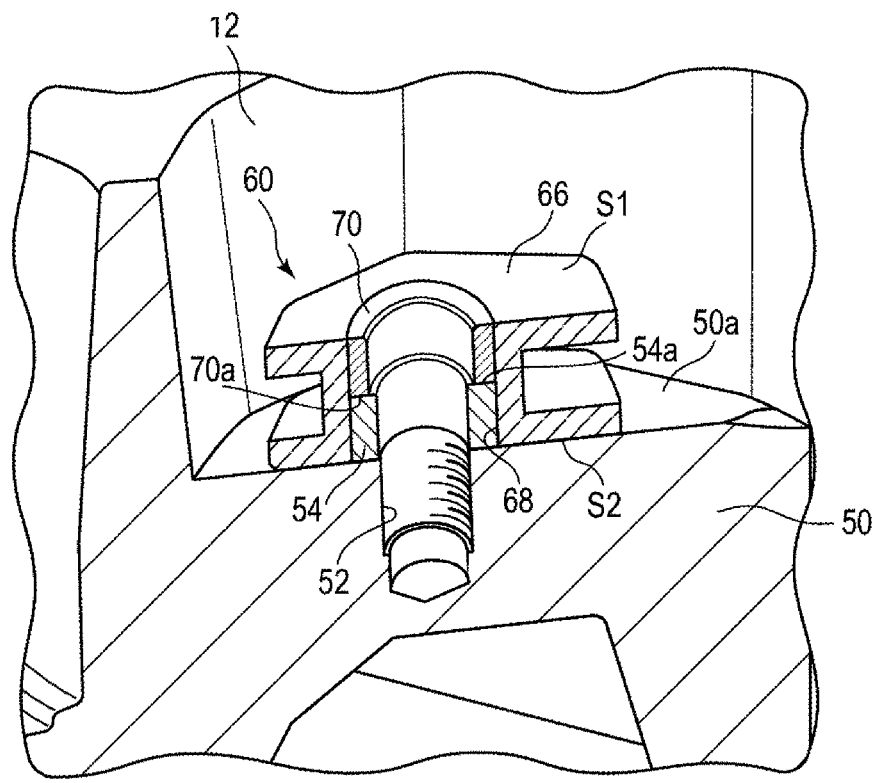
FIG. 12 is a sectional view of the ramp installation portion and the ramp of the HDD according to the second embodiment.

FIG. 10 is a perspective view showing a ramp installation portion of an HDD according to a second embodiment, FIG. 11 is a perspective view showing a state wherein a ramp-side second sleeve is engaged with a support sleeve of the ramp installation portion, and FIG. 12 is a sectional view of the ramp installation portion and the ramp of the HDD according to the second embodiment.

According to the second embodiment, as shown in FIG. 10, the support sleeve 54 installed on the installation face 50*a* of the ramp installation portion 50 is configured with a sleeve that is a separate part, and is fixed to the installation face 50*a*. A depth in a radial direction of each of the pair of positioning recesses 56 of the support sleeve 54 is smaller than a thickness of the support sleeve 54. Because of this, the recess 56 is opened in only the contact face 54*a* and an outer peripheral face of the support sleeve 54, and an inner peripheral face side of the support sleeve 54 is closed by a peripheral face 56*c*.

Specifically, each positioning recess 56 is formed in, for example, an approximately rectangular form, and has the pair of side faces 56*b*, which extend in the axial direction of the support sleeve 54 and oppose each other across a gap in the circumferential direction of the support sleeve 54, the bottom face 56*a* of an arc form, which is positioned between the pair of side faces 56*b*, and the peripheral face 56*c*, which is disposed upright in the axial direction. In one example, the pair of positioning recesses 56 are provided separated by 180 degrees in the circumferential direction.

FIG. 11 shows a state wherein only the second sleeve 70 is engaged with the support sleeve 54. As shown in the drawing, the second sleeve 70 on the ramp 60 side has an outer diameter and an inner diameter approximately equivalent to an outer diameter and an inner diameter of the support sleeve 54. The second sleeve 70 has the pair of positioning protruding portions 72, which protrude downward from the lower end face. The pair of positioning protruding portions (only one is shown in the drawing) 72 are provided at an interval of approximately 180 degrees in the circumferential direction of the second sleeve 70. The protruding portion 72 has a size and a form such that the protruding portion 72 can be engaged with the positioning recesses 56 of the support sleeve 54. More specifically, each protruding portion 72 has a circumferential direction width smaller than the circumferential direction width of the recess 56, and a protrusion height less than the depth in the axial direction of the recess 56. Further, the protruding portion 72 can come into contact with either side face (regulating face) 56*b* of the recess 56. In the present embodiment, the inner peripheral face of the protruding portion 72 is engaged with the peripheral face 56*c* of the positioning recess 56, and contributes to a planar direction positioning of the ramp 60.

As shown in FIG. 12, the support sleeve 54 is inserted and fitted into the through hole 68 of the support bracket 66 in a state wherein the support bracket 66 is installed in the ramp installation portion 50. The lower end face of the second sleeve 70 comes into contact with the contact face 54*a* of the support sleeve 54, at the same time as which the lower face S2 of the support bracket 66 comes into contact with the installation face 50*a*. The pair of protruding portions 72 are positioned in the corresponding recess 56 (refer to FIG. 11). By the support bracket 66 being engaged with the peripheral face of the support sleeve 54, movement in the planar direction (a direction parallel to the installation face 50*a*) is regulated, whereby positioning in the planar direction is carried out. Also, positioning in the axial direction of the support bracket 66 is carried out by the lower face S2 and the lower end face of the second sleeve 70 coming into contact with the installation face 50*a* and the contact face 54*a* of the support sleeve 54 respectively. Furthermore, positioning in the circumferential direction of the support bracket 66 is carried out by the protruding portion 72 being pivoted to a position in which the protruding portion 72 comes into contact with one side face 56*b* of the recess 56, and coming into contact, whereby movement in the circumferential direction (the direction of rotation) of the support bracket 66 is regulated (rotation is stopped). According to the present embodiment, movement in the planar direction of the support bracket 66 is regulated by the protruding portion 72 coming into contact with the peripheral face 56*c* of the recess 56, which also contributes to planar direction positioning.

In a state wherein the support bracket 66 is positioned, the support bracket 66 is fixed to the ramp installation portion 50 by the aforementioned fixing screw being passed through the second sleeve 70 of the support bracket 66 and screwed into the screw hole 52.

In the second embodiment, other configurations of the HDD are the same as those of the HDD according to the first embodiment.

Figure 13:
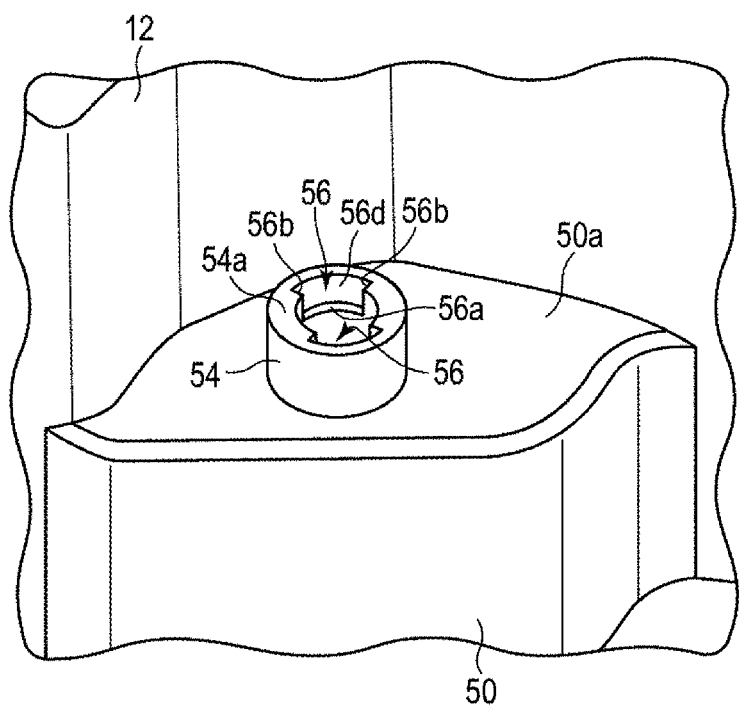
FIG. 13 is a perspective view showing a ramp installation portion of an HDD according to a third embodiment.
Figure 14:
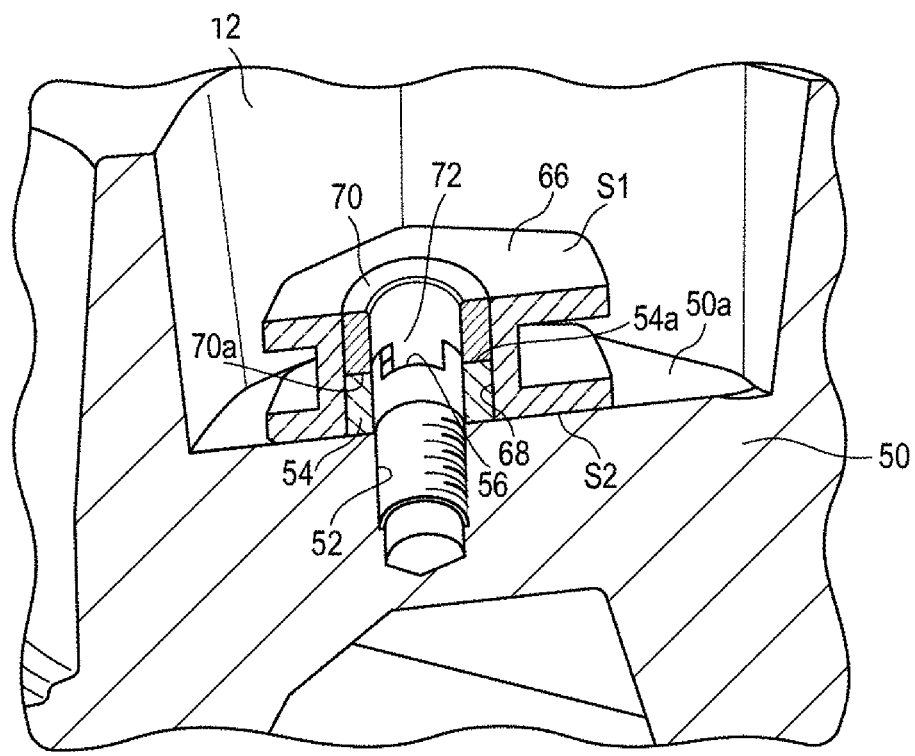
FIG. 14 is a sectional view of the ramp installation portion and a ramp of the HDD according to the third embodiment.

FIG. 13 is a perspective view showing a ramp installation portion of an HDD according to a third embodiment, and FIG. 14 is a sectional view of the ramp installation portion and a ramp of the HDD according to the third embodiment.

According to the third embodiment, as shown in FIG. 13, the depth in the radial direction of each of the pair of positioning recesses 56 of the support sleeve 54 is smaller than the thickness of the support sleeve 54. Each recess 56 is opened on only the inner peripheral face side of the support sleeve 54, and the outer peripheral face side of the support sleeve 54 is closed by a peripheral face 56*d*.

Each positioning recess 56 is formed in, for example, an approximately rectangular form, and is opened in the inner peripheral face and the contact face 54*a* of the support sleeve 54. Each positioning recess 56 has the pair of side faces 56*b*, which extend in the axial direction of the support sleeve 54 and oppose each other across a gap in the circumferential direction of the support sleeve 54, the bottom face 56*a* of an arc form, which is positioned between the pair of side faces 56*b*, and the peripheral face 56*d*, which is disposed upright in the axial direction. In one example, the pair of positioning recesses 56 are provided separated by 180 degrees in the circumferential direction.

As shown in FIG. 14, the second sleeve 70 of the support bracket 66 has the pair of positioning protruding portions (only one is shown in the drawing) 72. The protruding portion 72 has a size and a form such that the protruding portion 72 can be engaged with the pair of recesses 56 of the support sleeve 54. More specifically, each protruding portion 72 has a circumferential direction width smaller than the circumferential direction width of the recess 56, and a protrusion height less than the depth in the axial direction of the recess 56. Further, the protruding portion 72 can come into contact with either side face 56*b* of the recess 56.

Positioning in the circumferential direction of the support bracket 66 is carried out by the protruding portion 72 coming into contact with one side face 56*b* of the recess 56, whereby movement in the circumferential direction (the direction of rotation) is regulated (rotation is stopped). According to the present embodiment, movement in the planar direction of the support bracket 66 is regulated by the protruding portion 72 coming into contact with the peripheral face 56d of the recess 56, which also contributes to planar direction positioning.

In the third embodiment, other configurations of the HDD are the same as those of the HDD according to the first embodiment.

Figure 15:
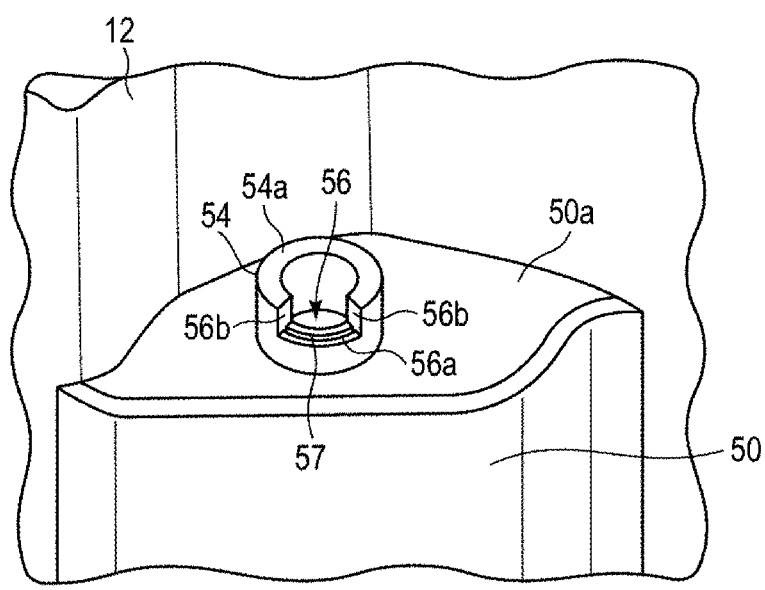
FIG. 15 is a perspective view showing a ramp installation portion of an HDD according to a fourth embodiment.
Figure 16:
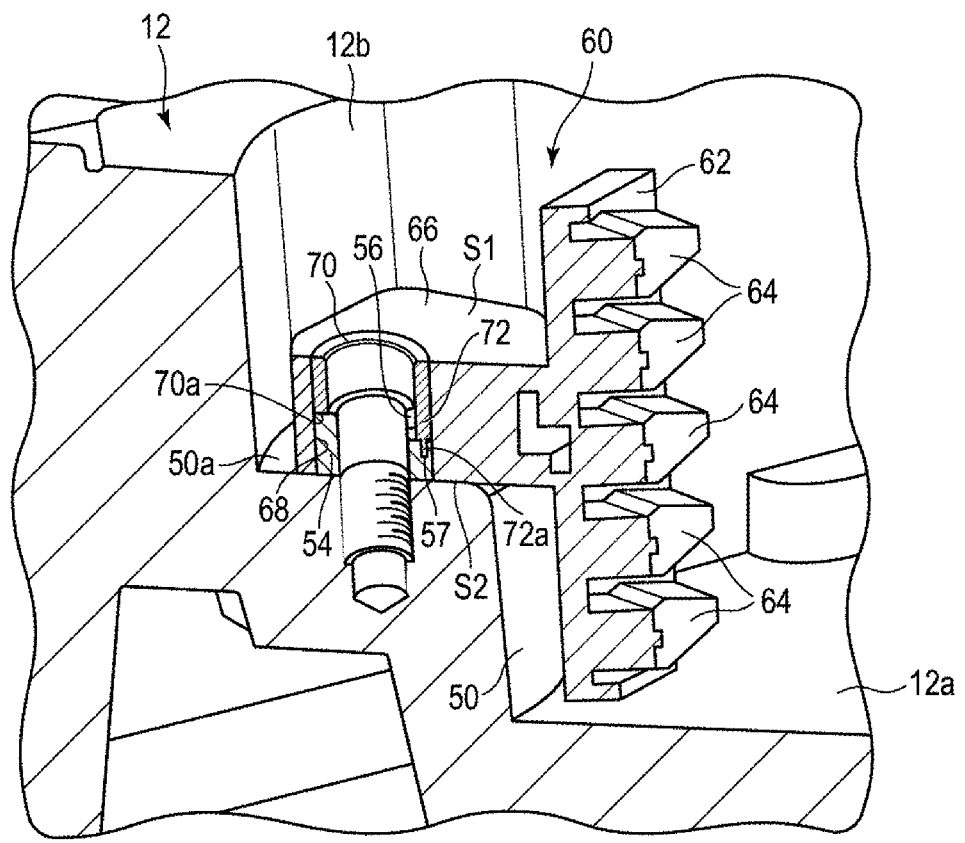
FIG. 16 is a sectional view of the ramp installation portion and a ramp of the HDD according to the fourth embodiment.

FIG. 15 is a perspective view showing a ramp installation portion of an HDD according to a fourth embodiment, and FIG. 16 is a sectional view of the ramp installation portion and a ramp of the HDD according to the fourth embodiment.

According to the fourth embodiment, as shown in FIG. 15, the support sleeve 54 has one positioning recess 56. The positioning recess 56 is formed in, for example, an approximately rectangular form, and is opened in the inner peripheral face, the outer peripheral face, and the contact face 54a of the support sleeve 54. Each positioning recess 56 has the pair of side faces 56b, which extend in the axial direction of the support sleeve 54 and oppose each other across a gap in the circumferential direction of the support sleeve 54, and the bottom face 56a of an arc form, which is positioned between the pair of side faces 56b. According to the present embodiment, the recess 56 further has an arc-form groove (or slit) 57 formed in the bottom face 56a. The groove 57 extends in the circumferential direction between the pair of side faces 56b.

As shown in FIG. 16, the second sleeve 70 provided in the support bracket 66 has the positioning protruding portion 72 that engages with the positioning recess 56, and furthermore, has a projection 72a that protrudes in an axial direction from the positioning protruding portion 72. The projection 72a is formed in an arc form that corresponds with the groove 57. The support bracket 66 and the second sleeve 70 are mounted in the support sleeve 54 of the ramp installation portion 50, the positioning protruding portion 72 engages with the positioning recess 56, and furthermore, the projection 72a is inserted into the groove 57. Owing to an engagement of the inner peripheral face of the through hole 68 of the support bracket 66 and the outer peripheral face of the support sleeve 54, and furthermore, owing to an engagement of the projection 72a and the groove 57, movement in the planar direction of the support bracket 66 and the ramp 60 is regulated, whereby positioning in the planar direction is carried out. Also, owing to the positioning protruding portion 72 coming into contact with the side face 56b of the positioning recess 56, pivoting of the support bracket 66 is regulated, and positioning (rotation stopping) in the circumferential direction is carried out.

In the fourth embodiment, other configurations of the HDD are the same as those of the HDD according to the first embodiment.

The same operational advantages as in the first embodiment can also be obtained from the second to fourth embodiments configured as heretofore described. Also, according to the second to fourth embodiments, movement of a ramp in a planar direction is regulated by combining a positioning recess having a side face or a positioning recess having a groove and a positioning protruding portion or a projection, whereby the ramp can be positioned more stably.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

For example, a positioning recess of a support sleeve and a positioning protruding portion of a second sleeve are not limited to a configuration wherein there is one pair of each. It is sufficient that at least one each of a recess and a protruding portion are provided. Also, a configuration wherein a positioning protruding portion is provided in a support sleeve and a positioning recess is provided in a second sleeve may be adopted. A positioning recess and protruding portion not being limited to a rectangular form, other kinds of form may be selected.

What is claimed is:

1. A magnetic disk device, comprising:
   a housing comprising a base, a side wall surrounding the base, and a pedestal disposed adjacent to an interior portion of the side wall;
   a magnetic disk provided on the base;
   an actuator comprising a head; and
   a ramp configured to couple to the pedestal, wherein the pedestal comprises:
      a first face having a first hole configured to receive a fastener,
      a support sleeve, having a recess, disposed on the first face and coaxial with the first hole, and
   the ramp comprises:
      a second face that opposes the first face of the pedestal,
      a second hole in the second face and configured to receive the support sleeve, and
      at least a first protrusion configured to fit within the recess of the pedestal.

2. The magnetic disk device according to claim 1, wherein the support sleeve further comprises an annular contact face, the recess being disposed within the annular contact face and having a first side face that extends parallel to an axis of the first hole, and
   the ramp comprises a second sleeve disposed coaxially with the engagement hole and configured to contact the contact face, the second sleeve comprising the first protrusion.

3. The magnetic disk device according to claim 1, wherein the support sleeve is integrally formed with the pedestal.

4. The magnetic disk device according to claim 2, wherein the recess comprises a bottom face positioned approximately parallel to the first face, and
   a second side face, the second side face extending parallel to the axis of the first hole and disposed across a gap in a circumferential direction of the support sleeve from the first side face.

5. The magnetic disk device according to claim 2, wherein the second sleeve is integrally formed with the ramp and comprises a resin.

6. The magnetic disk device according to claim 2, wherein the second sleeve comprises a metal, and is disposed within the second hole of the ramp.

7. The magnetic disk device according to claim 4, wherein the recess defines an opening of the support sleeve in a radial direction of the support sleeve.

8. The magnetic disk device according to claim 7, wherein the recess comprises a groove in the bottom face, the groove extending in the circumferential direction of the support sleeve, and wherein
   the protrusion comprises a projection configured to fit within the groove.

9. The magnetic disk device according to claim 4, wherein the recess further comprises:

an inner peripheral face positioned between the first side face and the second side face, and wherein the protrusion is configured to contact the inner peripheral face and one of the first side face and the second side face.

10. The magnetic disk device according to claim 4, wherein the recess further comprises:

an outer peripheral face positioned between the two side faces, and wherein the protrusion is configured to contact the outer peripheral face and one of the first side face and the second side face.

11. The magnetic disk device according to claim 1, wherein the protrusion is configured to contact the first side face or the second side face of the recess to regulate pivoting of the ramp around the support sleeve.

12. The magnetic disk device according to claim 1, wherein the actuator is configured to support and drive a head.

13. The magnetic disk device according to claim 12, wherein the ramp is configured to hold the head in an unloading position.

14. The magnetic disk device according to claim 13, wherein the ramp comprises a guide face that supports the head.

15. The magnetic disk device according to claim 1, wherein the ramp is configured to couple to the pedestal with a fastener passed through the first hole and the second hole.

16. The magnetic disk device according to claim 15, wherein the fastener is a screw and the first hole is a screw hole.

17. The magnetic disk device according to claim 1, wherein the support sleeve is tubular and disposed upright on the first face.

* * * * *